United States Patent
Quigley et al.

(10) Patent No.: US 9,298,916 B2
(45) Date of Patent: Mar. 29, 2016

(54) METHOD AND APPARATUS FOR ENHANCED FILE SYSTEM MONITORING ON MOBILE COMMUNICATIONS DEVICES

(71) Applicant: Lookout Inc., San Francisco, CA (US)

(72) Inventors: Matthew Quigley, San Francisco, CA (US); David Kincade, San Francisco, CA (US); Brian James Buck, Livermore, CA (US); Timothy Micheal Wyatt, Toronto, CA (US)

(73) Assignee: LOOKOUT, INC., San Francisco, CA (US)

( * ) Notice: Subject to any disclaimer, the term of this patent is extended or adjusted under 35 U.S.C. 154(b) by 0 days.

(21) Appl. No.: 13/710,162

(22) Filed: Dec. 10, 2012

(65) Prior Publication Data

US 2014/0165190 A1     Jun. 12, 2014

(51) Int. Cl.
*G06F 11/00* (2006.01)
*G06F 21/55* (2013.01)

(52) U.S. Cl.
CPC ............ *G06F 21/556* (2013.01); *G06F 21/554* (2013.01)

(58) Field of Classification Search
CPC . G06F 11/3616; G06F 17/30569; G06F 8/71; G06F 21/564; G06F 21/562; G06F 21/57; G06F 21/563; G06F 21/565; G06F 21/566; G06F 21/51; G06F 21/52; G06F 21/554
See application file for complete search history.

(56) References Cited

U.S. PATENT DOCUMENTS

| | | | |
|---|---|---|---|
| 7,293,177 B2 * | 11/2007 | Lahti et al. | 713/188 |
| 7,660,797 B2 * | 2/2010 | Marinescu et al. | 726/22 |
| 7,676,845 B2 * | 3/2010 | Thomas | G06F 21/51 |
| | | | 713/189 |
| 8,087,067 B2 | 12/2011 | Mahaffey et al. | |
| 8,108,933 B2 | 1/2012 | Mahaffey | |
| 8,806,647 B1 * | 8/2014 | Daswani et al. | 726/25 |
| 2007/0240222 A1 * | 10/2007 | Tuvell et al. | 726/24 |
| 2008/0040804 A1 * | 2/2008 | Oliver et al. | 726/25 |
| 2009/0198709 A1 * | 8/2009 | Mishra | G06F 17/30569 |
| 2009/0282169 A1 * | 11/2009 | Kumar et al. | 709/248 |
| 2010/0058470 A1 * | 3/2010 | Kim | 726/22 |
| 2010/0100963 A1 * | 4/2010 | Mahaffey | 726/25 |
| 2011/0047620 A1 * | 2/2011 | Mahaffey | G06F 21/564 |
| | | | 726/23 |
| 2013/0247187 A1 * | 9/2013 | Hsiao et al. | 726/22 |

OTHER PUBLICATIONS

FileObserver, Android Developers <developer.android.com/reference/android/os/FileObserver.html>, Feb. 15, 2013; pp. 1-6.
Robert Love, Kernel Korner-Intro to inotify, <www.linuxjournal.com/article/8478>, Linux Journal #139; Nov. 2005; pp. 1-11.
(Continued)

*Primary Examiner* — Fatoumata Traore
*Assistant Examiner* — Khoi Le
(74) *Attorney, Agent, or Firm* — Dergosits & Noah LLP (57) ABSTRACT

A system and method for using file system events to trigger a security scan. A file system watches all writable directory paths for defined file system events on files in the watched paths. Upon occurrence of a watched event, the file is scanned using known security methods. A data structure stores events and can be used to update and track events. Cookies can be used to correlate MOVE events. A timer can be used to avoid repetitive scanning after discrete WRITE events.

17 Claims, 8 Drawing Sheets

(56) References Cited

OTHER PUBLICATIONS

Martin Streicher, Monitor file system activity with inotify, <ibm.com/developerWorks>, IBM © IBM Corporation 1994, 2008, Sep. 16, 2008; pp. 1-12.

Corbet, Watching filesystem events with inotify, <Iwn.net/Articles/104343>, © 2004, Eklektrix, Inc., Sep. 29, 2004; pp. 1-3.

Lee Cocking, Mobile Device Sandboxing 101, Fixmo Inc., <fixmo.com/blog/2012/05/11/mobile-device-sandboxing-101>, © 2009-2013, Fixmo, Inc., May 11, 21012; pp. 1-3.

* cited by examiner

```
#include <stdio.h>
#include <stdlib.h>
#include <errno.h>
#include <sys/types.h>
#include <sys/inotify.h>
#define EVENT_SIZE ( sizeof (struct inotify_event) )
#define BUF_LEN    ( 1024 * ( EVENT_SIZE + 16 ) )

#define EVENT_SIZE ( sizeof (struct inotify_event) )
#define BUF_LEN    ( 1024 * ( EVENT_SIZE + 16 ) )

int main(int argc, char **argv)
{
    int length, i = 0;
    int fd;
    int wd;
    char buffer[BUF_LEN];

fd = inotify_init();

if ( fd < 0 ) {
        perror( "inotify_init" );
    } wd = inotify_add_watch( fd, "/home/strike",
              IN_MODIFY | IN_CREATE | IN_DELETE );
    length = read( fd, buffer, BUF_LEN );

if ( length < 0 ) {
        perror( "read" );
    } while ( i < length ) {
        struct inotify_event *event = ( struct inotify_event * ) &buffer[ i ];
        if ( event->len ) {
            if ( event->mask & IN_CREATE ) {
                if ( event->mask & IN_ISDIR ) {
                    printf( "The directory %s was created.\n", event->name );
                }
                else {
                    printf( "The file %s was created.\n", event->name );
                }
            }
            else if ( event->mask & IN_DELETE ) {
                if ( event->mask & IN_ISDIR ) {
                    printf( "The directory %s was deleted.\n", event->name );
                }
                else {
                    printf( "The file %s was deleted.\n", event->name );
                }
            }
            else if ( event->mask & IN_MODIFY ) {
                if ( event->mask & IN_ISDIR ) {
                    printf( "The directory %s was modified.\n", event->name );
                }
                else {
                    printf( "The file %s was modified.\n", event->name );
                }
            }
        }
        i += EVENT_SIZE + event->len;
    }

( void ) inotify_rm_watch( fd, wd );
    ( void ) close( fd );

exit( 0 );
}
```

METHOD AND APPARATUS FOR ENHANCED FILE SYSTEM MONITORING ON MOBILE COMMUNICATIONS DEVICES

COPYRIGHT NOTICE

A portion of this patent disclosure contains material which is subject to copyright protection. The copyright owner has no objection to the facsimile reproduction by anyone of the patent disclosure, as it appears in the records of the U.S. Patent & Trademark Office, but otherwise reserves all rights.

TECHNICAL FIELD

This disclosure relates generally to programs useful for mobile communications devices, and for systems communicating with and controlling mobile communications devices, and specifically, for monitoring file system events on such devices and systems.

BACKGROUND

The use of mobile communications devices continues to experience astronomical growth. Factors contributing to this growth include advancements in network technologies, lower data usage costs, and the growing adoption of smartphones, such as Android®- and Apple®-based smartphones. The fact that such devices are fast becoming ubiquitous for every day use on both personal and business levels further increases the risk for security-related issues on such devices. Thus, it remains desirable to provide improved systems and methods for identifying and resolving security concerns in the use of mobile communications devices.

BRIEF DESCRIPTION OF THE DRAWINGS

This disclosure is illustrated by way of example and not limitation in the figures of the accompanying drawings, in which like references indicate similar elements, and in which.

DETAILED DESCRIPTION

This disclosure describes systems and methods for using the occurrence of file system events to trigger other events, such as a security scan. A file system sets watches onto specified directory paths for defined file system events, such adding, changing, moving, renaming or deleting a file, and creating, moving, renaming or deleting a directory. When the defined file system event occurs, a new event is triggered, such as the file being security scanned using known methods.

In one embodiment, file system events can be stored in a data structure and assigned a unique identifier. New events, such as a MOVE event for the same file, can be used to update information stored in the data structure. Further, by setting a cookie for all MOVE events, pairs of MOVE_FROM and MOVE_TO events can be properly correlated. Old events can be reviewed and evaluated, as necessary, or removed after the related file is scanned.

In another embodiment, a timer is started upon receiving a WRITE event. If another WRITE event is received before the timer elapses, then the timer is reset and started again. When no more WRITE events are received before the timer elapses, then the file is scanned. This timer delay avoids repetitive scanning of a file after each partial download of the file completes.

1. HARDWARE/SOFTWARE ENVIRONMENT

It should be appreciated that embodiments of this disclosure can be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein. One will appreciate that the mobile communication device described herein may include any computer or computing device running an operating system for use on handheld or mobile devices, such as smartphones, PDAs, tablets, mobile phones and the like. For example, a mobile communications device may include devices such as the Apple iPhone®, the Apple iPad®, the Palm Pre™, or any device running the Apple iOS™, Android™ OS, Google Chrome OS, Symbian OS®, Windows Mobile® OS, Palm OS® or Palm Web OS™.

In the context of this disclosure, a computer usable medium or computer readable medium may be any non-transitory medium that can contain or store the program for use by or in connection with the instruction execution system, apparatus or device. For example, the computer readable storage medium or computer usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical system, apparatus or device for storing information. Alternatively or additionally, the computer readable storage medium or computer usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer readable instructions may be referred to as components or modules or data objects or data items. Applications may be hardwired or hard coded in hardware or take the form of software executing on a general purpose computer such that when the software is loaded into and/or executed by the computer, the computer becomes an apparatus for practicing the disclosure. Applications may also be downloaded in whole or in part through the use of a software development kit or toolkit that enables the creation and implementation of an embodiment of the disclosure. In this specification, these implementations, or any other form that an embodiment of the disclosure may take, may be referred to as techniques. In general, the order of the steps of disclosed processes may be altered within the scope of the disclosure.

As used herein, the term "mobile communications device" refers to mobile phones, PDAs and smartphones. The term "mobile communications device" also refers to a class of laptop computers which run an operating system that is also used on mobile phones, PDAs, or smartphones. Such laptop computers are often designed to operate with a continuous connection to a cellular network or to the internet via a wireless link. The term "mobile communications device" excludes other laptop computers, notebook computers, or sub-notebook computers that do not run an operating system that is also used on mobile phones, PDAs, and smartphones. Specifically, mobile communications devices include devices for which wireless communications services such as voice, messaging, data, or other wireless Internet capabilities are a primary function. As used herein, a "mobile communications device" may also be referred to as a "device," "mobile device," "mobile client," or "handset." However, a person having skill in the art will appreciate that while the present invention is disclosed herein as being used on mobile communications devices, the present invention may also be used on other computing platforms, including desktop, laptop, notebook, netbook or server computers.

As used herein, the term "client computer" refers to any computer, embedded device, mobile device, or other system that can be used to perform the functionality described as being performed by the client computer. Specifically, client computers include devices which can be used to display a user interface by which the functionality provided by the server can be utilized by a user. Client computers may be able to display a web page, load an application, load a widget, or perform other display functionality that allows the client computer to report information from the server to the user and to receive input from the user in order to send requests to the server.

As used herein, services associated with the identification, analysis and removal of potentially undesired applications or other data objects from mobile communications devices, as well as mobile communications device protection generally, are described under the non-limiting term "security." Thus, an embodiment of this disclosure is directed to providing security to a plurality of mobile communication devices, such as a plurality of mobile communication devices for a group of employees, or a plurality of mobile communication devices that access a particular network.

Figure 1:
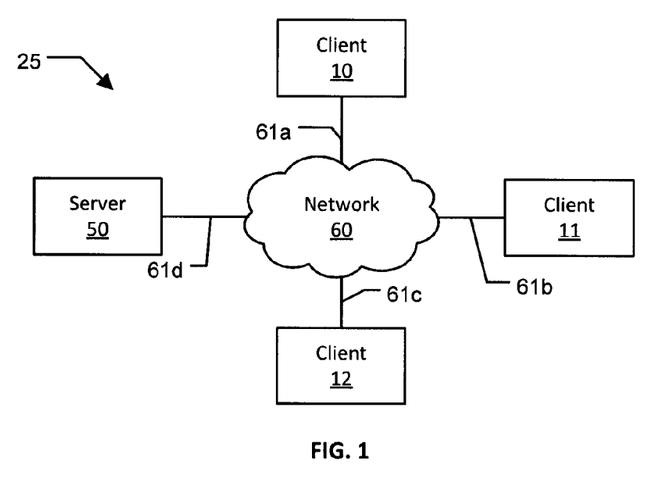
FIG. 1 is a simplified block diagram illustrating a distributed computing system.

FIG. 1 is a simplified block diagram of a distributed computer network 25 having a number of client systems 10, 11 and 12, and a server system 50, all coupled to a communications network 60 via a plurality of communications links 61. Communications network 60 provides a mechanism for allowing the various components of distributed network 5 to communicate and exchange information with each other.

Communications network 60 may itself be comprised of many interconnected computer systems and communications links. Communications links 61 may be hardwire links, optical links, satellite or other wireless communications links, wave propagation links, or any other mechanisms for communication of information. Various communications protocols may be used to facilitate communication between the various systems shown in FIG. 1. These communications protocols may include TCP/IP, HTTP, WAP, vendor-specific protocols, customized protocols, Internet telephony, IP telephony, digital voice, voice over broadband (VoBB), broadband telephony, Voice over IP (VoIP), public switched telephone network (PSTN), and others. In one embodiment, the communications network 60 is the Internet, while in other embodiments, communications network 60 may be any suitable communications network including a local area network (LAN), a wide area network (WAN), a wireless network, an intranet, a private network, a public network, a switched network, and combinations of these, and the like.

Distributed computer network 25 in FIG. 1 is merely illustrative of one embodiment and not intended to be limiting. One of ordinary skill in the art would recognize other variations, modifications and alternatives. For example, more than one server system 50 may be connected to communications network 60. As another example, any number of client systems 10, 11 and 12 may be coupled to communications network 60 via an access provider (not shown) or some other server system.

A client system typically requests information from a server system, which then provides the information in return. Server systems typically have more computing and storage capacity than client systems. However, any computer system may act as either a client or server depending on whether the computer system is requesting or providing information. Aspects of the systems and methods described herein may be embodied in either a client device or a server device, and may also be embodied using a client-server environment or a cloud-cloud computing environment.

In the configuration of FIG. 1, server 50 is responsible for (i) receiving information requests from any of client systems 10, 11 and 12, (ii) performing processing required to satisfy the requests, and (iii) forwarding the results corresponding to the requests back to the requesting client system. The processing required to satisfy the request may be performed by server system 50 or may alternatively be delegated to other servers or resources connected to server 50 or communications network 60.

Client systems 10, 11 and 12 enable users to access and query information or applications stored by or accessible through server system 50. Some example client systems include desktop computers, portable electronic devices (e.g., mobile communication devices, smartphones, tablet computers, laptops) such as the Samsung Galaxy Tab®, Google Nexus devices, Amazon Kindle®, Kindle Fire®, Apple iPhone®, the Apple iPad®, Microsoft Surface®, the Palm Pre™, or any device running the Apple iOS™, Android™ OS, Google Chrome OS, Symbian OS®, Windows Mobile® OS, Windows Phone, BlackBerry OS, Embedded Linux, webOS, Palm OS® or Palm Web OS™.

In one embodiment, a web browser application executing on a client system enables users to select, access, retrieve, or query information and/or applications stored by or accessible through server system 50. Examples of web browsers include the Android browser provided by Google, the Safari® browser provided by Apple, Amazon Silk® provided by Amazon, the Opera Web browser provided by Opera Software, the BlackBerry® browser provided by Research In Motion, the Internet Explorer® and Internet Explorer Mobile browsers provided by Microsoft Corporation, the Firefox® and Firefox for Mobile browsers provided by Mozilla®, and others (e.g., Google Chrome).

Figure 2:
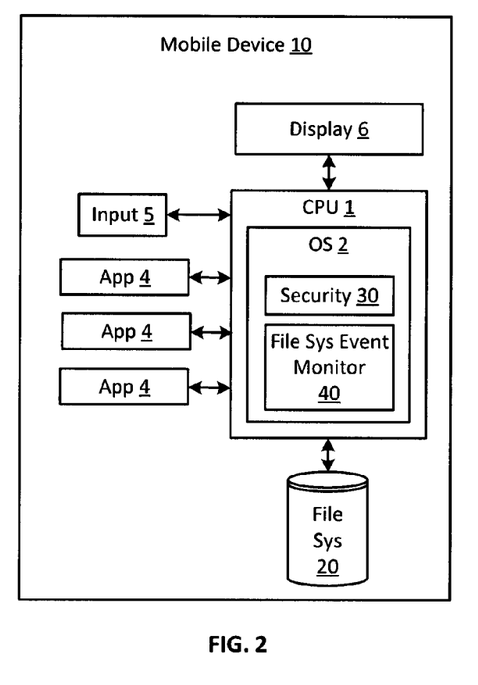
FIG. 2 is a block diagram illustrating one embodiment of a mobile communications device.

FIG. 2 shows a typical client device 10, embodied as a mobile communications device. In various embodiments described herein, a user can interface with other devices, networks, systems, etc., through mobile communications device 10. Mobile communications device 10 is a processor-based computing device having CPU 1 controlled through operating system (OS) 2, which provides the interface for hardware and software operations on the device, including applications 4, input device(s) 5, display 6 and file system 20.

Input device 5 may also include a touchscreen (e.g., resistive, surface acoustic wave, capacitive sensing, infrared, optical imaging, dispersive signal, or acoustic pulse recognition), keyboard (e.g., electronic keyboard or physical keyboard), buttons, switches, stylus, or combinations of these.

File system 20 is provided for mass storage, which for a mobile communications device may include flash and other nonvolatile solid-state storage or solid-state drive (SSD), such as a flash drive, flash memory, or USB flash drive. Other examples of mass storage include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), battery-backed-up volatile memory, tape storage, reader, and other similar media, and combinations of these.

A security component 30 is preferably fully integrated with the OS 2, but could also be provided as a separate application. The security component 30 permits monitoring and analysis of security related information for the mobile communications device 10.

A file systems event monitoring (FSEM) component 40 is also preferably fully integrated with the OS 2, but could also be provided as a separate application. The FSEM component 40 permits monitoring and analysis of file system events for the mobile communications device 10, as described in more detail below.

Also included in mobile communications device 10 but not shown in FIG. 1 are familiar components, such as memory, battery, speaker, microphone, RF transceiver, antenna, ports, jacks, connectors, camera, input/output (I/O) controller, display adapter, network interface, and the like.

The techniques described herein may also be used with mobile communications devices having different configurations, e.g., with additional or fewer subsystems. For example, a mobile communication device could include more than one processor (i.e., a multiprocessor system, which may permit parallel processing of information) or a device may include a cache memory. The mobile communication device shown in FIG. 2 is but one example of a system suitable for use. Other configurations of subsystems suitable for use will be readily apparent to one of ordinary skill in the art.

Computer software products may be written in any of various suitable programming languages, such as C, C++, C#, Pascal, Fortran, Perl, Matlab (from MathWorks, www.mathworks.com), SAS, SPSS, JavaScript, CoffeeScript, Objective-C, Objective-J, Ruby, Python, Erlang, Lisp, Scala, Clojure, and Java. The computer software product may be an independent application with data input and data display modules. Alternatively, the computer software products may be classes that may be instantiated as distributed objects. The computer software products may also be component software such as Java Beans (from Oracle) or Enterprise Java Beans (EJB from Oracle).

An operating system for the mobile communications device may be the Android operating system, iPhone OS (i.e., iOS), Windows Phone, Symbian, BlackBerry OS, Palm web OS, bada, Embedded Linux, MeeGo, Maemo, Limo, or Brew OS. Other examples of operating systems include one of the Microsoft Windows family of operating systems (e.g., Windows 95, 98, Me, Windows NT, Windows 2000, Windows XP, Windows XP x64 Edition, Windows Vista, Windows 7, Windows 8, Windows CE, Windows Mobile, Windows Phone 7), Linux, HP-UX, UNIX, Sun OS, Solaris, Mac OS X, Alpha OS, AIX, IRIX32, or IRIX64. Other operating systems may be used.

Furthermore, the mobile communications device may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the device and components (or steps) of a system useful in practicing the systems and methods in this application using a wireless network employing a protocol such as Wi-Fi (IEEE standards 802.11, 802.11a, 802.11b, 802.11e, 802.11g, 802.11i, and 802.11n, just to name a few examples). For example, signals from a mobile communications device may be transferred, at least in part, wirelessly to components or other computers.

2. FILE SYSTEM MANAGEMENT

As noted above, a FSEM component 40 is provided as an integral part of the operating system 2 on the mobile communications device 10, or alternatively, as an application layer directly interfacing with the OS. For mobile communications devices using the Android platform, which is a Linux-based operating system, there are useful features built into the Linux kernel for memory management, process management, networking and other operating systems services.

For example, the Linux kernel includes a feature called "inotify" (on kernel versions 2.6.13 or later) that monitors file systems for Linux-based devices and provides alerts to attentive applications for relevant file system events, such as read, write, move, delete, and even unmount operations. According to one embodiment of the present invention, the inotify feature is used to monitor the file systems of computing devices, such as mobile communications devices and/or servers, as part of an overall process for security scanning of files in the device file systems. Effective file system monitoring can provide the trigger for many other defined events on the mobile communications device, and the inotify feature provides an example of how to integrate file system management features into control and security schemes for mobile communications devices. This feature and related features could be implemented by creating APIs and system calls for a particular operating system (or an application layer on top of the operating system) similar to the Linux inotify feature, or more generally, the Android FileObserver interface.

In this embodiment, using the inotify feature to create a watch is simple. A file descriptor is created, a watch descriptor is attached to the file descriptor, and both descriptors are stored in a data structure. A watch descriptor is defined by a path and a set of events. Various methods may be used to receive event information from the descriptor, such the Linux system calls read( ), poll( ), epoll( ), and select( ), among others, which provide an entry point into the Linux kernel.

There are three system API calls that are made to build file system event monitors of all kinds:

(1) inotify_init( ) initializes a new inotify instance and returns a file descriptor associated with a new event queue on success, and (−1) on failure.

(2) inotify_add watch( ), as its name implies, adds a watch. Each watch must provide a pathname and a list of pertinent events, where each event is specified by a constant, such as IN_MODIFY. To monitor more than one event, simply use the logical or (the pipe (|) operator in C) between each event. If inotify_add_watch( ) succeeds, the call returns a unique identifier for the registered watch; otherwise, it returns −1. The identifier is used to change or remove the associated watch.

(3) inotify_rm_watch( ) removes a watch.

Figure 3:
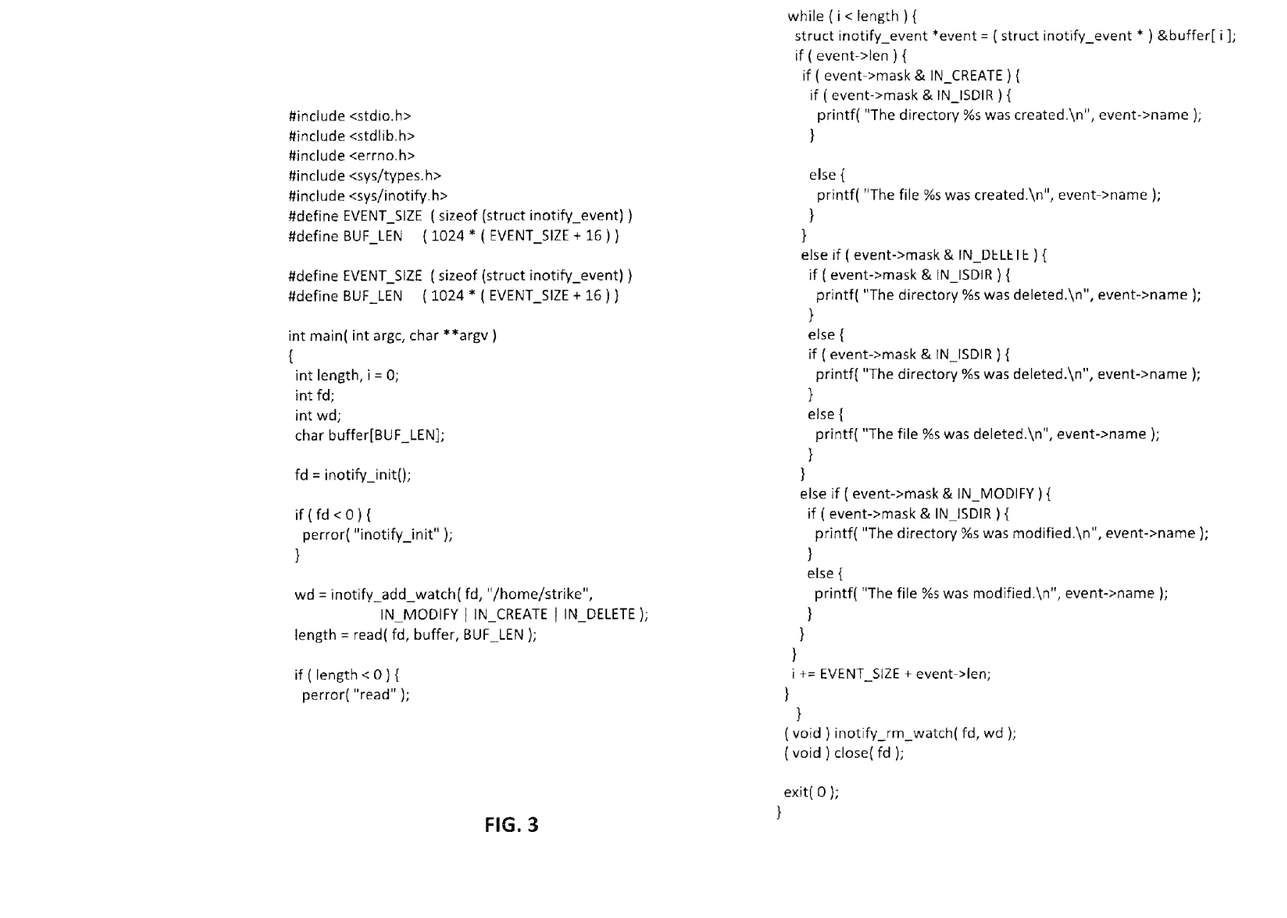
FIG. 3 is an example program listing for initiating a file system watch in order to monitoring file system events.

FIG. 3 shows an example of a simple inotify application written to monitor a directory for create, delete and modify events. The application creates an inotify instance with fd=inotify_init( ) and adds a single watch to monitor modifications, new files, and destroyed files in the path/home/strike, as specified by wd=inotify_add_watch( . . . ). The read( ) method blocks until one or more alerts arrive. The specifics of the alerts, namely each file and each event, are sent as a stream of bytes; hence, the loop in the application casts the stream of bytes into a series of event structures.

The inotify feature can be used to watch for many different file system events on both files and directories, but in this disclosure, the following events are of primary interest: CLOSE_WRITE, MOVED_FROM, MOVED_TO, CREATE (for folder creation), and DELETE_SELF (for folder deletion). By attaching a watch to a directory, any event for a file in that directory will be detected by the inotify feature.

Figure 4:
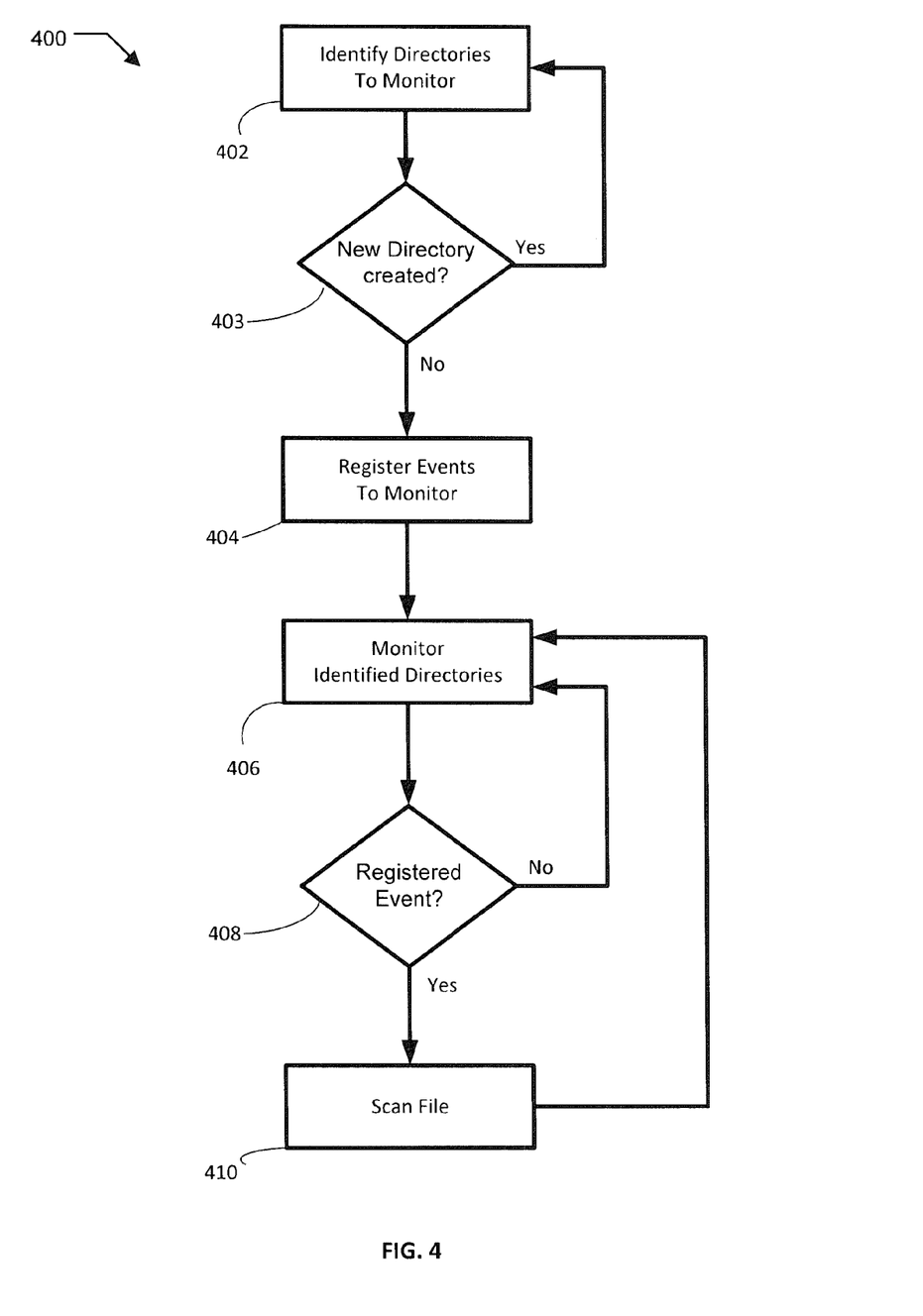
FIG. 4 is a flow chart illustrating a process for monitoring file system events.

Referring now to FIG. 4, a process 400 is illustrated for performing a security scan using security component 30 of files identified by FSEM component 40 on mobile communications device 10. In step 402, the directories to be monitored by FSEM component 40 are identified. The user can manually identify specific target directories, but a preferred method for identifying directories is to conduct a crawl of all world-writeable file systems (SD card, writable internal directories, etc.) on the mobile communications device using well-known techniques. If new directories are created in step 403, for example, as detected by a programmed inotify watch, they could be added automatically to the list of directories in step 402.

Crawling all writeable file systems is an ideal objective, but in reality, read permissions may be necessary to access certain directories, and thus could limit which directories can be watched. Further, redundant and circular path references need to be avoided. It can be useful therefore to keep a history log to determine whether a path has already been visited, and also, whether it is writeable. Likewise, it can be useful to maintain a cross reference log of writable paths/mount points that may be accessible despite the inability of a crawl to identify that location due to lack of permission. A <temp> directory is a typical example of such a mount point.

In step 404, specific file system events to be monitored are registered. The specific file system events of primary interest in this disclosure are CLOSE_WRITE, MOVED_FROM, MOVED_TO, CREATE (for folder creation), and DELETE_SELF (for folder deletion), although other file system events could also be registered and monitored. In step 406, the registered events are monitored. This means that an inotify watch for the registered events is attached to each identified directory.

In step 408, if a registered file system event is detected by the inotify watch for a file in an identified directory, then a security scan of the file is performed by the security component 30 in step 410. If an unregistered event or no event is detected in step 408, or once a scan is completed in step 410, then file system monitoring continues for watched directories in step 406.

The nature and scope of the techniques used in the security component 30 are beyond the scope of this disclosure, except to say that known techniques may be used; but the reader is directed to the following patent disclosures, each expressly incorporated by reference herein, which describe methods and systems for providing security to mobile computing devices of all types: For example, see U.S. Pat. No. 8,087,067 entitled Secure Mobile Platform System; U.S. Pat. No. 8,108,933 entitled System and Method for Attack and Malware Prevention; and pending U.S. Pat. Pub. No. 2011/0047620 entitled System and Method for Server-Coupled Malware Prevention.

One simple technique for limiting the scope of files to be scanned is to identify a set of what items not to scan, such as system files and folders, development folders, certain file types, like read-only files, or specific file extensions, etc.

When a file system event is received from the inotify watcher, it can be stored and tracked, for example, by writing the event to a bidirectional hash map or other data structure. Preferably, a unique identifier is assigned to each event, such as a simple incrementing identifier, and the event location is stored as a value with the identifier being the key. If another event is received for the same file, for example a MOVE event, then the stored reference to the event can be updated with the new location.

Figure 5:
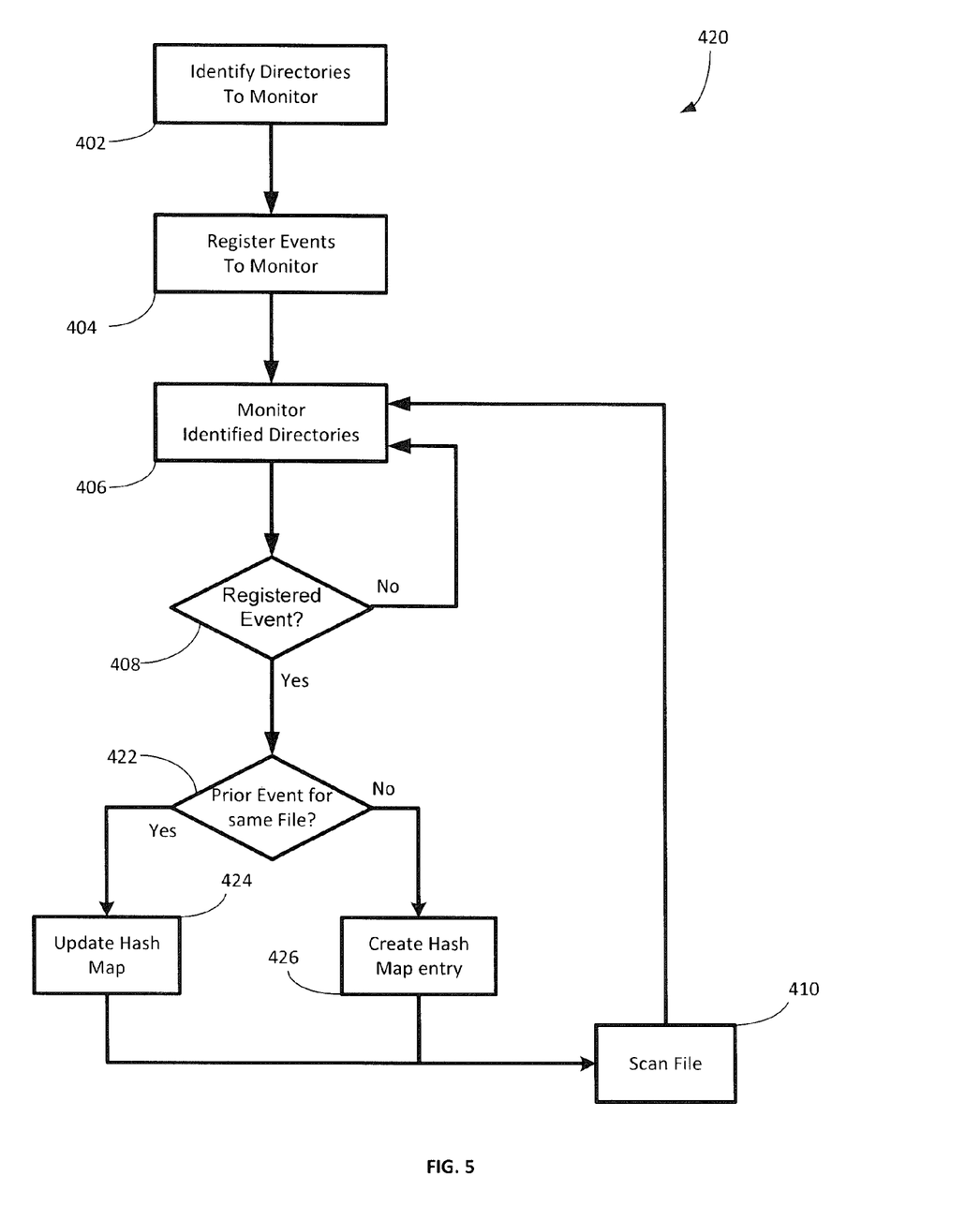
FIG. 5 is a flow chart illustrating an alternative process for monitoring file system events.

This is shown by process 420 in FIG. 5, which is a variation of process 400 of FIG. 4. Process 420 includes the same steps 402, 404, 406, 408, but after a registered event is detected in step 408, the event is added or updated in the hash map. In step 422, the FSEM component 40 looks up the just-detected event in the hash map to see if a prior event for the same file has already been recorded in the hash map. If so, the event entry can be updated in step 424. If not, the event can be added to the hash map in step 426. In either case, the process then goes to the security scan in step 410 and proceeds accordingly, and after scanning the event may optionally be removed from the hash map.

The consequence of updating the event location in the hash map is that downstream customers of the scan see the updated located of the file due to use of the identifier. Queries for the old location return nothing, and this location is made available for other writes or moves. Likewise, when a path is overwritten by another file, the prior identifier associated with that path in the hash map becomes invalid, and any activity associated with that prior identifier (such as a watch or a scan) becomes unnecessary and may be cancelled.

The hash map provides a representation of the status of monitored files at one instant in time. A bidirectional hash map can be implemented as two hashmaps, so that lookups can go either way—look up the value given the identifier, or look up the identifier given the value. This allows tremendous flexibility. For example, when a file first starts writing, it may be written to a temporary location such as file.tmp, and that location gets associated with a unique identifier. But when writing is complete, the file is no longer file.tmp, but file.apk, i.e., it has been moved. Thus, the updated reference is made through the unique identifier, and not through the file name.

Move tracking is also made much easier using the inotify watch feature, which uses cookies to tie together move events, i.e., to correlate MOVED_FROM pairs with MOVE_TO pairs. For example, when watching both the source directory and the destination directory, inotify generates two move events when a file is moved from one directory to another— one for the source event, and one for the destination event. The two events are tied together by setting a cookie, and using the cookie to match the events.

A problem can arise with simply running the scan step 410 after creating or updating the event in the hash table for write events in particular. For example, streaming data or large data files are typically written to disk in small portions or chunks of data, being appended to the same file at intervals. Further, the end of each chuck is signified with a CLOSE_WRITE event. If that event is taken to initiate a scan of the file, then the same file will be scanned many times, wasting time and resources unnecessarily.

To solve this problem, a timer is preset to wait for a short period of time, like one half second to one second, after receiving a CLOSE_WRITE event. If another CLOSE_WRITE event is received for the same path before the timer has elapsed, then the timer is reset and the wait begins again. In this way, the file will not be scanned until the file is finished downloading (or to be more precise, until the preset time has passed).

Figure 6:
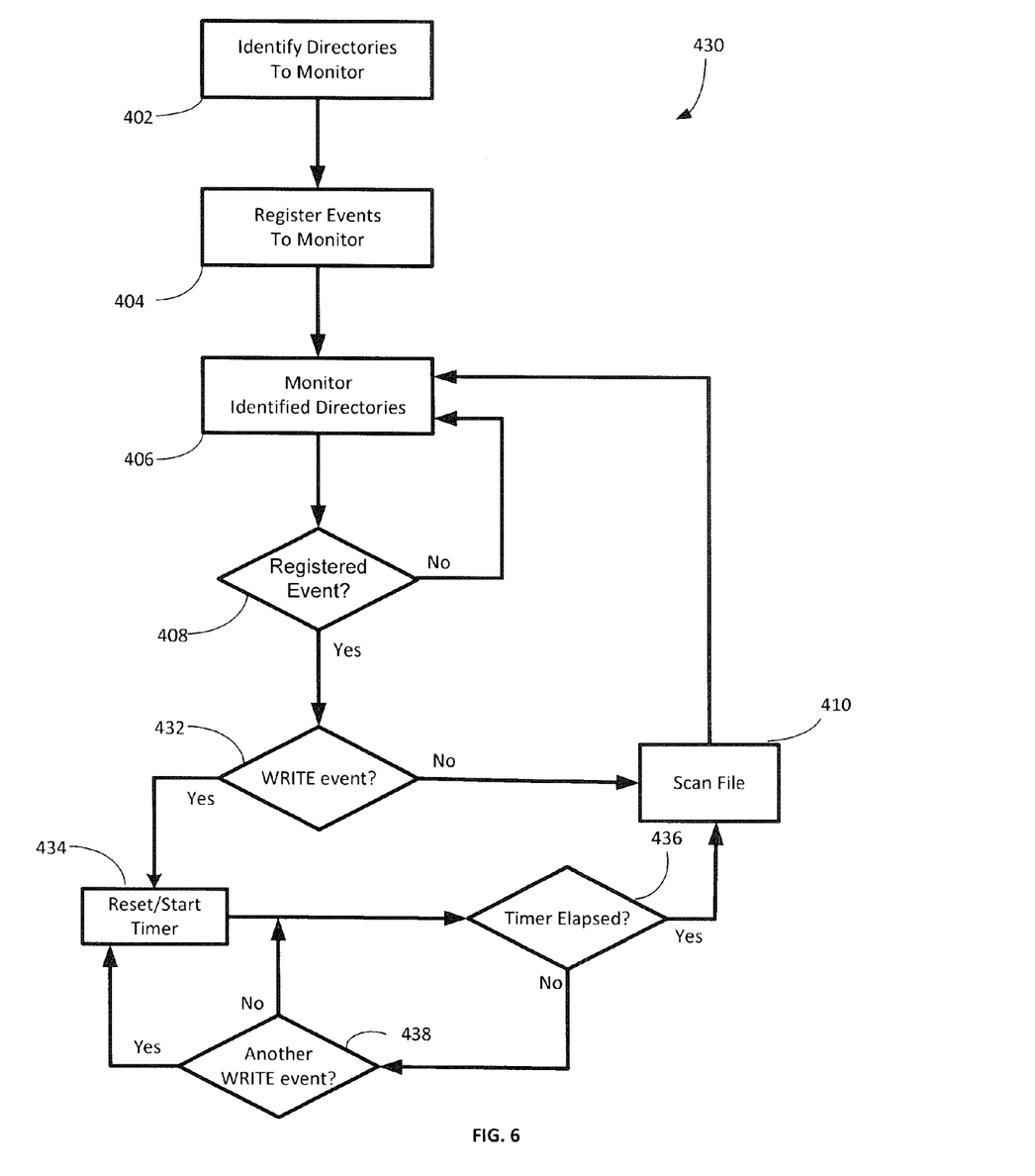
FIG. 6 is a flow chart illustrating an alternative process for monitoring file system events.

This variation is illustrated by process 430 shown in FIG. 6, with the same process steps 402, 404, 406 and 408 as before. In process 430, after an event is detected in step 408, then determine whether the event is a WRITE event (CLOSE_WRITE for inotify) in step 432. If not, then scan the file as usual in step 410. However, if the event was a WRITE event in step 432, then a preset timer is started (or restarted) in step 434. If the timer then elapses after the preset time in step 436, then we assume the file has finished downloading, and proceed to scan the file in step 410.

If the timer has not elapsed in step 436, then it has been interrupted by another event. In step 438, determine whether the event is another WRITE event. If so, then the timer is reset in step 434 and the timer wait begins again. If the event is not another WRITE event, then the timer continues running until the timer elapses in step 436 or another event interrupts in step 438.

3. ALTERNATIVE CONFIGURATIONS

The various processes described above made reference generally to the embodiment of FIG. 2, where the mobile communications device 10 runs an operating system 2, applications 104 are installed on the device, stored using the file system 20 of the device, and run under the control of the OS. In that embodiment, the provision of security component 30 and FSEM component 40 on mobile communication device 10 allow for local operation and management of these functions. However, in other embodiments, the security component 30 and/or the FSEM component 40 may be located elsewhere, and in particular, on a server device or system interacting with the mobile communication device. In such devices or systems, the security component 30 and/or the FSEM component 40 may have the same operational functionality described above, and may preferably be integrated as part of the OS for such server devices; but may also be run as application layers on top of the OS for such server devices or systems. The following configurations rely on applications installed only on the server, with files stored in the file system of the server, with all file monitoring and security scanning taking place in the file system of the server.

Figure 7:
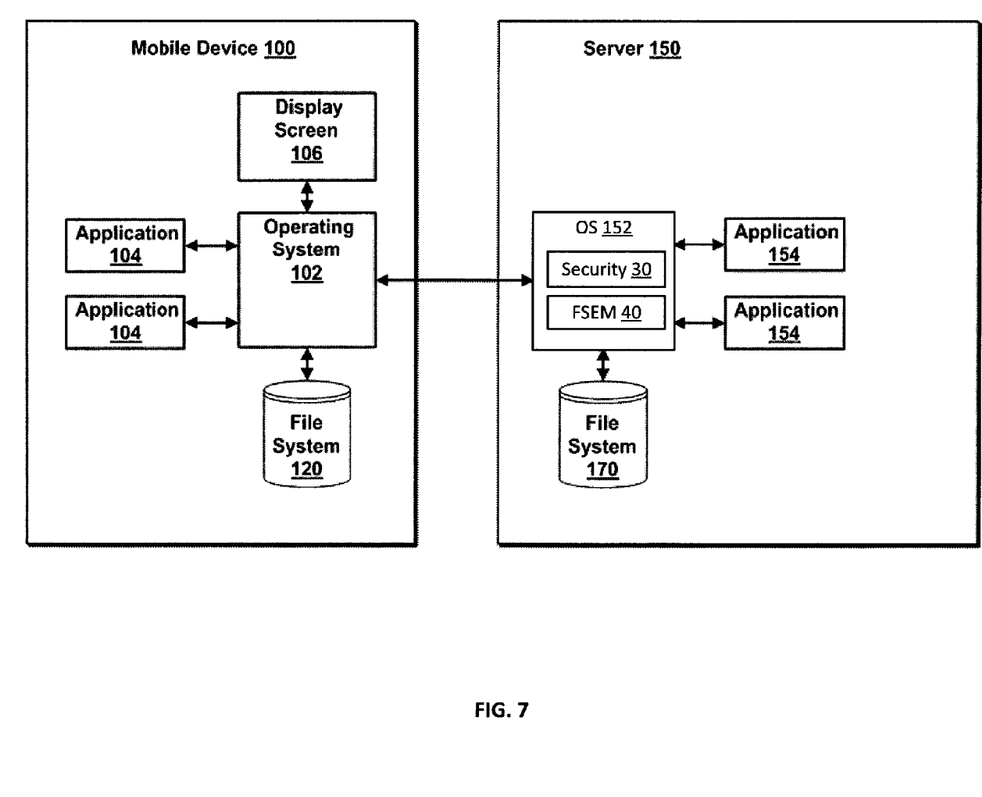
FIG. 7 is a block diagram illustrating an alternative embodiment of a mobile communications device.

One embodiment of a mobile communications device 100 is shown in FIG. 7. As in FIG. 2, device 100 has a processor 101 controlled through an operating system 102, and selectively running various applications 104. Also included are a display screen 106 and a file system 120. However, in this embodiment, there is an associated server 150 coupled with the mobile device 100, which has its own operating system 152 and corresponding file system 170, as well as applications 154. The server 150 in this embodiment is intended as a master control point for mobile device 100, as well as any other of the user's mobile devices. Thus, rather than have particular applications installed and run on the mobile device 100, these applications are installed on the server and controlled from the server. This may be viewed as a particular form of virtualization. Applications 154 in this architecture are not installed as apps 104 directly on the mobile device 100; rather they are installed as apps 154 on the server 150, and stored in the file system 170 on the server 150.

All of the discussion above regarding file systems operations and management on mobile communications device 10 applies equally to file system operations and management for file system 170 on server 150. That is, all file operations actually take place on the server 150, and thus security component 30 and FSEM component 40 are preferably fully integrated into the OS 152 of server 150 (or operated as an application layer), to monitor file operations on file system 170, and scan files as necessary under the control of security component 30. File systems events with a particular mobile communications device can be allocated to specific directory locations, for example, and those locations monitored by the FSEM component 40.

When a user wants to run an application, the mobile device OS 102 requests that the server OS 152 provide the necessary files, such as application executables and associated data, to the mobile communications device. The server OS 152 sends the necessary files to the mobile OS 102 in response to the request, and the mobile OS stores these files temporarily in file system 120, then executes the application. Any modifications to the files made while the application is running on the mobile communications device 100 may be either (a) immediately sent to the server 150 so that the modifications can be made immediately to the corresponding file(s) on the server, or (b) saved and dealt with at a later time, which may be after the application has finished running, or is still running, at which time the modifications are sent to the server 150 so that a decision can be made whether or not to make the corresponding modifications, to do so if appropriate. Such decisions may be made based on security and privacy policies in place on the server.

After the application has finished running, the files on the mobile communications device are marked for removal, which may happen immediately or at a later time. If the same application is initiated again while the necessary files still reside on the mobile communications device (e.g., the files have not yet been removed), and the files are the same version, then the mobile communications device can use these local copies rather than requesting copies of the necessary files again from the server. In this way, the local file system 120 on the mobile communications device is acting like a local cache for the necessary files, but the definitive and permanent version resides on the server and its file system.

Figure 8:
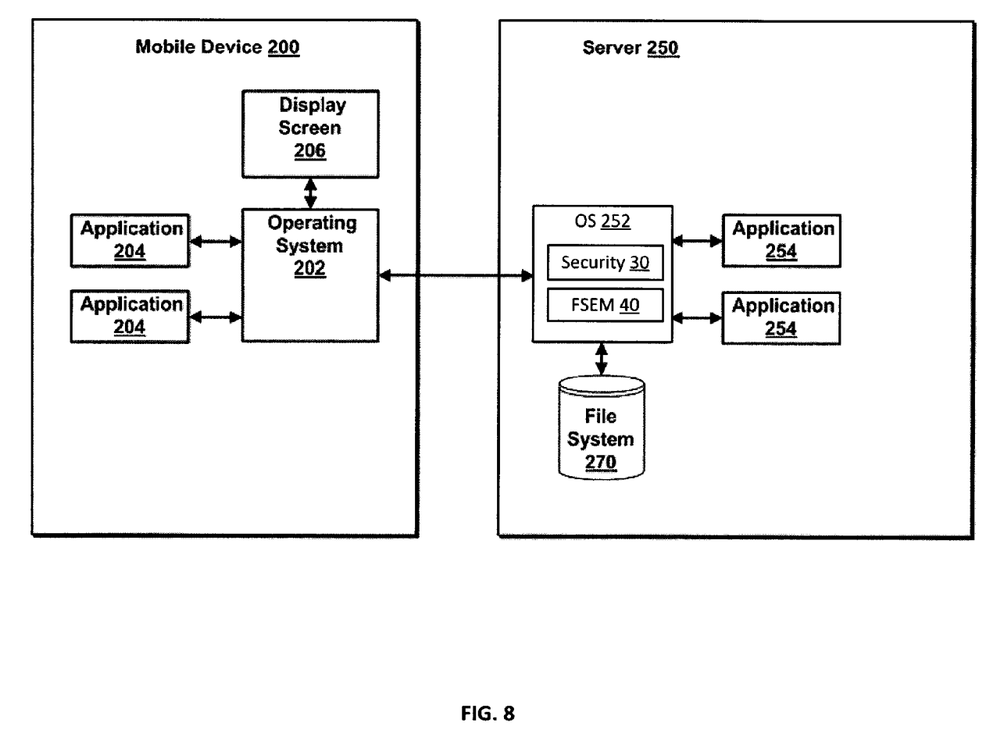
FIG. 8 is a block diagram illustrating an alternative embodiment of a mobile communications device.

An alternative embodiment having mobile communications device 200 coupled with server 250 is illustrated in FIG. 8. This embodiment is similar to FIG. 7 in that applications are permanently installed and run from the server 250, and not directly on the mobile communications device 200. However, in this embodiment there is no local file system, so that executable files and associated data cannot be locally stored on the mobile communications device 200. Instead, any necessary files requested from the server OS 252 are placed directly into memory on the mobile communications device 200 and executed. Any file reads or writes by applications 204 running on the mobile communications device 200 are directed by the mobile OS 202 via the server OS 252 to the server file system 270. No application data is stored locally on the mobile communications device 200, only in the file system 270 on server 250. Applications 204 exist in the memory of the mobile communications device while they are being executed or prepared for execution, but after the application has ended, these sections of memory are marked for removal/reuse. If an application is initiated again by the user while a copy of the application executables remain in memory, and it is the same version as is held by the server 250, then the mobile OS 202 may simply use that local memory copy rather than requesting it again from the server 250. In this configuration, the mobile communications device 200 is a pure execution engine for applications and has no permanent file system.

Figure 9:
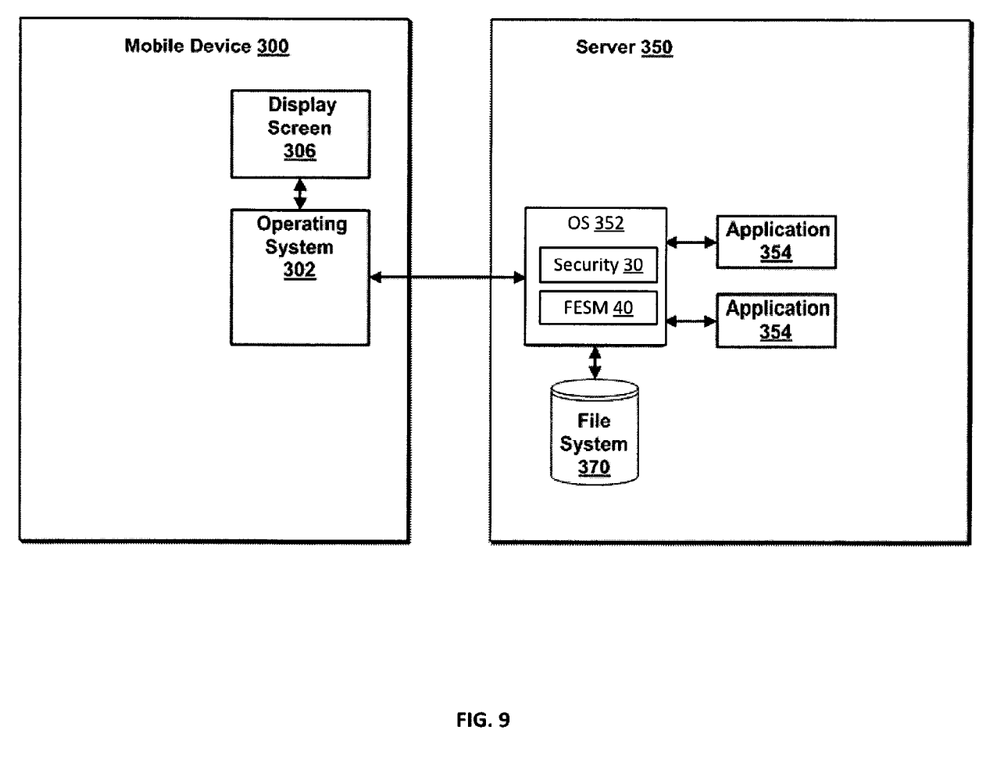
FIG. 9 is a block diagram illustrating an alternative embodiment of a mobile communications device.

An alternative embodiment is shown in FIG. 9, where applications 354 are installed and run on the server 350, and executable files and associated data files are stored in the file system 370 of the server. In this embodiment, the mobile communications device 300 does not run the applications on the mobile OS 302 at all, but instead, the applications 354 are run on the server OS 352, and requests by the application to draw to screen are sent by the server OS to the mobile OS, with the drawing operations taking place on the display screen 306 of the mobile communications device. Requests by the application 354 for user input, such as touch, taps, typing, etc., are sent from the application 354 via the server OS 352 to the mobile OS 302, and the user input is gathered from any local sensors or devices configured on the mobile communications device 300 (e.g., from a touch screen on the mobile communications device) In this configuration, the mobile communications device 300 is a pure display and user interaction engine for applications, and does not run applications on the mobile communications device.

In the embodiments of FIGS. 7 and 8, any network operations from a running application on the mobile communications device may optionally be routed through the server so that the server OS (or special applications running on the server) can provide security and/or privacy operations on network communications initiated by the running application. Such a configuration is an alternative to network operations being conducted directly from the mobile communications device, as in FIG. 2.

All of the alternative embodiments described above can all be viewed as a form of containerization. Containerization, or sandboxing, is a technique of program isolation used to enforce security or privacy policies. In each of these alternative embodiments, some or all of the executables and/or data reside on the server, and not on the mobile communications device. Therefore, an enterprise could use any one of these alternative architectures as a containerization solution. For example. the user's personal applications could be installed upon and run conventionally on the mobile communications device, but all enterprise data and applications could be run from one of the server-based architectures of FIGS. 7-9. All existing types of mobile containerization are vulnerable to attacks against data that is physically stored on the mobile communications device; but in the alternative architectures described above, there is no permanently stored application data on the mobile communications device, and thus the threat to data security is reduced.

There are generally three types of sandboxing: (i) Type 1: a hypervisor upon which one or more virtualized operating systems run that are completely sandboxed; (ii) Type 2: in which a virtualization layer runs atop the native operating system on a device, and a guest operating system (and applications within it) run within that virtualization layer; and (iii) Type 3: application wrappers, content wrappers, and work space wrappers, which tend to be application-oriented types of virtualization that are functionally oriented and although similar to type 2 don't represent a full virtualization layer with a guest operating system; the work space itself is an application what runs other applications and enforces isolation. (See the article "*Mobile Device Sandboxing* 101," http://fixmo-.com/blog/2012/05/11/mobile-device-sandboxing-101). Any of the three types of containerization can be employed on the server side in conjunction with any of alternative architectural models described above.

In addition, any of the three alternative configurations described above with reference to FIGS. 7-9 could be implemented in a base configuration, that is, with all modifications made to the operating system on the mobile communications device. Alternatively, any of three hybrid configurations could be implemented with modifications made to the operating system on the server. For example, in a Type 1 containerization scenario, one of the virtualized operating systems is a modified operating system on the server. A Type 2 containerization scenario may have a virtualization layer running atop the host operating system which contains a guest operating system that is a modified operating system on the server. A Type 3 containerization scenario may have an application wrapped so as to virtualize access to files, displays, and sensors.

4. CONCLUSION

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for security scanning mobile communications device files, comprising:
   identifying a subset of all directories in writeable file systems on the mobile communications device by a file system event monitoring component;
   registering write operation events that are to be monitored with the file system event monitoring component;
   monitoring only the identified subset of directories for occurrences of the registered write operation events with the file system event monitoring component; and
   with a security component upon the occurrence of a first registered write operation event for a particular file, starting a timer for a predefined time period, and resetting the timer upon the occurrence of a second registered write operation event for the particular file within the predefined time period; and,
   when the timer times out, with the security component, scanning the particular file to determine the security status of the particular file.

2. The method of claim 1, the step of identifying the subset of all directories further includes crawling the mobile communications device writeable file systems with the file system event monitoring component to locate and identify the directories.

3. The method of claim 1, wherein the monitoring step further comprises the file system event monitoring component assigning a unique identifier for each occurrence of a registered write operation event, then storing each identifier and a corresponding location of a file for the registered write operation event in a data structure.

4. The method of claim 3, further comprising the file system event monitoring component updating the location of the particular file in the data structure when the particular file is moved or deleted.

5. The method of claim 3, wherein the monitoring step further comprises:

the file system event monitoring component periodically sweeping through the data structure to determine if the particular file has been written since the last sweep, and if not, performing the scanning step with the security component then removing the particular file from the data structure with the file system event monitoring component, and if so, marking the file to be scanned on the next sweep.

6. The method of claim 1, wherein the file system event monitoring component is a watch program configured with a plurality of directory paths corresponding to the identified subset of directories and the registered write operation events.

7. The method of claim 1, further comprising the file system event monitoring component adding new directories to the set of identified subset of directories when the new directories are created.

8. A method for security scanning mobile communications device files identified by a file system event monitoring component using a security component, comprising:
   using the file system event monitoring component, crawling the mobile communications device file systems to identify a subset of all writeable directories for monitoring;
   registering, with the file system event monitoring component, the identified subset of all writeable directories for monitoring and registering an identification of write operation events to be monitored;
   using the file system event monitoring component, monitoring only the registered subset of all writeable directories for the registered write operation events;
   using the file system event monitoring component, identifying a first registered file system event in a particular file in the registered subset of all writeable directory;
   by the security component, upon the identification of the occurrence of a first registered write operation event for the particular file by the file system event monitoring component, starting a timer for a predefined time period, and resetting the timer upon the identification of the occurrence of a second registered write operation event for the particular file within the predefined time period; and
   when the timer times out, scanning the particular file with the security component to determine the security status of the particular file.

9. The method of claim 8, further comprising the security component granting or denying access to the particular file based upon the security status of the file.

10. The method of claim 8, further comprising the security component providing a notification of the security status of the particular file to the mobile communication device.

11. The method of claim 8, wherein the step of identifying a first registered write operation event further comprises:
   the file system event monitoring component assigning a unique identifier to the first registered write operation event; and
   the file system event monitoring component storing the identifier and a location of the file for the first registered write operation event in a data structure.

12. The method of claim 11, wherein the data structure is a bidirectional hash map.

13. The method of claim 11, further comprising the file system event monitoring component updating the location of the particular file in the data structure when the particular file is moved or deleted.

14. The method of claim 8, further comprising the file system event monitoring component registering and monitoring a new directory when the new directory is created.

15. The method of claim 8, further comprising the security component performing the security scan only for selected file types.

16. A method for performing a security scan of files by a security component on a server, wherein a mobile communications device is coupled through a network to the server, and the mobile communications device requests files from the server, comprising:
   allocating to file requests from the mobile communications device, by a file system event monitoring component on the server, a subset of all directories on writable file systems of the server;
   registering, with the file system event monitoring component, write operation events to be monitored;
   attaching, with the file system event monitoring component, event watchers for the registered write operation events to the allocated subset of all directories;
   monitoring, with the event watchers, only the allocated subset of all directories for occurrences of the registered write operation events;
   by the security component, upon the occurrence of a first registered write operation events for a particular file as determined by the file system event monitoring component, starting a timer for a predefined time period, and resetting the timer upon the occurrence of a second registered write operation event for the particular file within the predefined time period; and
   when the timer times out, scanning, with the security component, the particular file to determine the security status of the particular file.

17. A method for monitoring file systems on a mobile communications device in order for a security component to take a defined action in response to a registered write operation event, comprising:
   identifying a subset of all directories on the mobile communications device by a file system event monitoring component;
   registering write operation events that are to be monitored with the file system event monitoring component;
   monitoring only the identified subset of all directories for occurrences of the registered write operation events with the file system event monitoring component;
   by the security component, upon the occurrence of a first registered write operation event for a particular file, starting a timer for a predefined time period, and resetting the timer upon the occurrence of a second registered write operation event for the particular file within the predefined time period; and
   when the timer times out, taking a defined action on the mobile communications device by the security component.

* * * * *